No. 713,517.  
J. M. SMITH.  
VEHICLE.  
(Application filed Aug. 5, 1902.)  
(No Model.)  
Patented Nov. 11, 1902.
2 Sheets—Sheet 1.
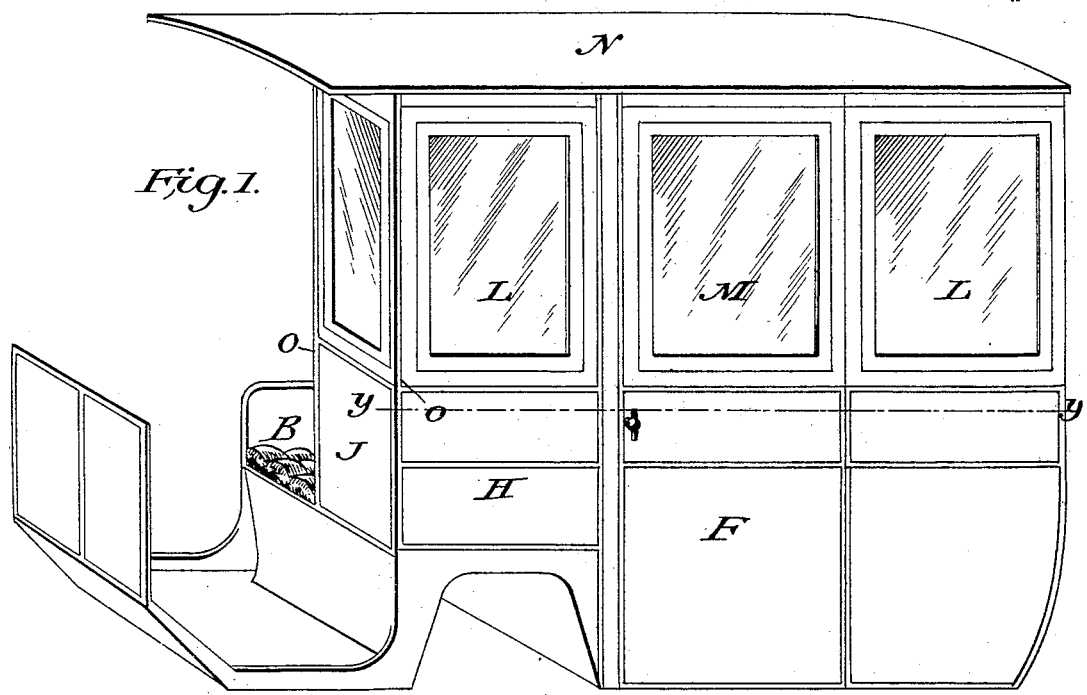
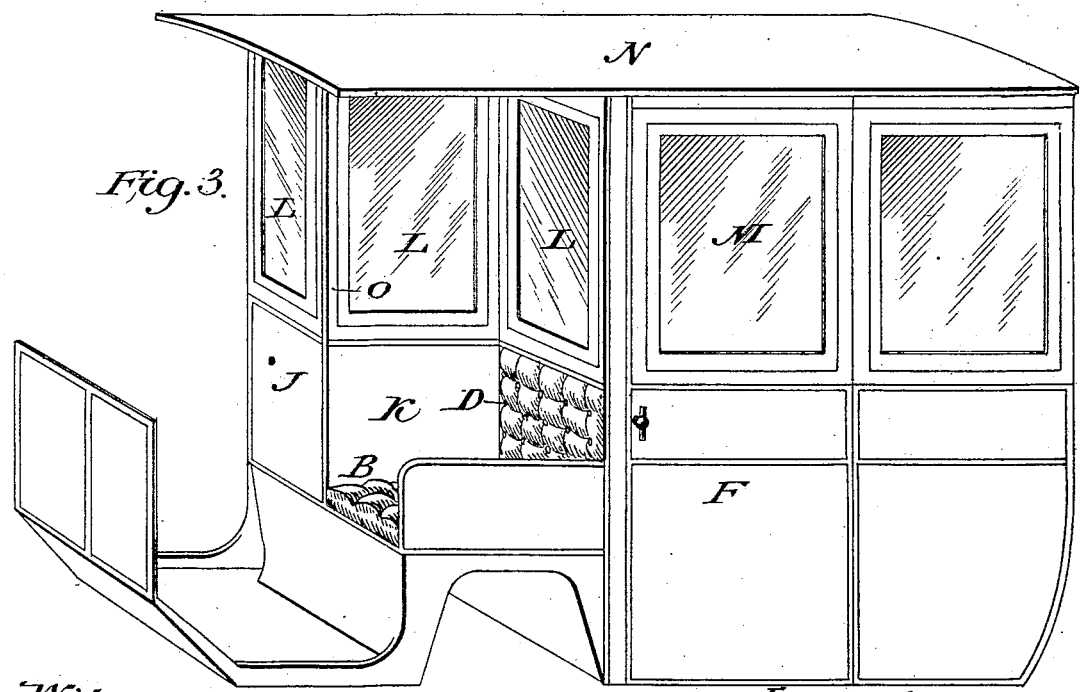
Witnesses:  
Chas. H. Baker  
F. H. Hiatt  
Inventor:  
J. M. Smith,  
by J. E. Stebbins,  
Attorney No. 713,517. Patented Nov. 11, 1902.
J. M. SMITH.
VEHICLE.
(Application filed Aug. 5, 1902.)
(No Model.) 2 Sheets—Sheet 2.
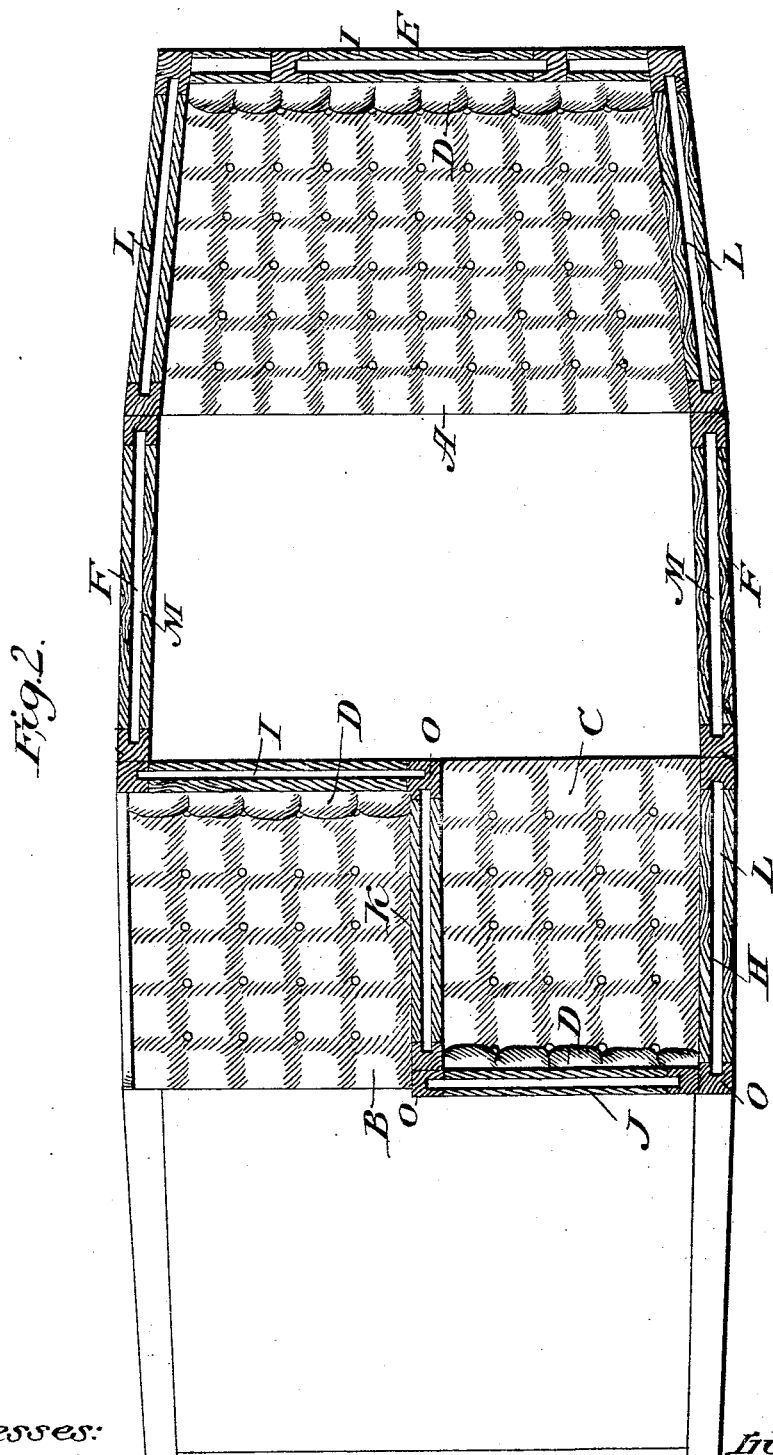
Witnesses:
Chas. H. Baker.
F. H. Hiatt.
Inventor:
J. M. Smith.
by J. E. Stebbins, Attorney

UNITED STATES PATENT OFFICE.

JOHN M. SMITH, OF ATLANTA, GEORGIA.

VEHICLE.

SPECIFICATION forming part of Letters Patent No. 713,517, dated November 11, 1902.

Application filed August 5, 1902. Serial No. 118,431. (No model.)

*To all whom it may concern:*

Be it known that I, JOHN M. SMITH, a citizen of the United States, residing at Atlanta, in the county of Fulton and State of Georgia, have invented new and useful Improvements in Vehicles, of which the following is a specification.

My invention relates to vehicles, and specifically to the bodies of rockaways, depot-wagons, automobiles, and the like, in which, as usually constructed, the rear double seat is inclosed and the two front seats, one of them for the use of the driver, are open or uninclosed.

The object of my invention is to reform the construction of the body, so that one of the front seats shall be inclosed, preferably on three sides, by permanent partitions, the remaining side being open to the inclosed space occupied by the rear double seat, thus forming a closed vehicle with one double and one single inclosed seat and an outside driver's seat, the said driver's seat and the adjacent inclosed seat being side by side and facing in opposite directions.

My invention consists in certain novelties of construction and combinations of parts hereinafter set forth, and pointed out in the claims.

The accompanying drawings illustrate one example and one modification of the physical embodiment of my invention, constructed according to the best modes I have so far devised for the practical application of the principle.

Figure 1 is a perspective view of a rockaway-body embodying my invention. Fig. 2 is a sectional plan view of Fig. 1, taken on line *y y*. Fig. 3 is a perspective view similar to Fig. 1, but showing the inclosed single seat upon the opposite side of the vehicle.

Referring to the several figures of the drawings, the letter A designates the rear double seat; B, the front open seat; C, the front inclosed seat; D, the back upholstering of the several seats; E, the back wall or panel of the vehicle; F, the doors; G, the back quarters or panels; H, the panel of the closed front seat; I, the panel at the back of the open seat; J, the front panel at the back of the closed single seat; K, the side panel of the inclosed seat; L, the drop glass frames; M, the glass frames in the doors, and N is the top of the vehicle.

The modification shown in Fig. 3 has the inclosed single seat upon the opposite side of the body from that shown in Fig. 1.

From the foregoing description, taken in connection with the drawings, it is obvious that I have produced a vehicle-body which fulfils all the conditions set forth as the object and purpose of my invention.

While I have illustrated only one example of the physical embodiment of my invention and one modification, I do not thereby intend to limit the scope thereof to such specific examples, inasmuch as changes may be introduced in practice which will not constitute substantial departures. For instance, I may embody the invention in automobile and other types of vehicles, make the glass frames of the body removable instead of dropping between the panels, and form the corners at O rounding or curved. All these and other changes I shall regard as colorable and as not taking a body having such changes and modifications of construction outside the scope of the claims.

What I claim as new, and desire to secure by Letters Patent, is—

1. A vehicle-body having a double rear seat and two seats at the front, one of the seats at the front being open or uninclosed, and the other a permanent seat facing the double rear seat and inclosed on three sides by permanent panels; said front seats being disposed side by side and facing in opposite directions.

2. A vehicle having a rear seat A, and two seats, B and C, at the front disposed side by side and facing in opposite directions; said seat B being open to the front and having at its back the panel I; and said seat C having at its back the permanent panel J and being closed at the sides adjacent the panel J; the arrangement being such that the seat C is open to the interior of the vehicle and to seat A.

In testimony whereof I affix my signature in presence of two witnesses.

JOHN M. SMITH.

Witnesses:
   J. E. SMITH,
   CHAS. F. DERNELL.